July 1, 1958     J. C. STICKLEY     2,840,948
BALLOON HOLDER
Filed Dec. 11, 1956

INVENTOR
J. C. STICKLEY
BY Kimmel & Crowell
ATTORNEYS

United States Patent Office 2,840,948
Patented July 1, 1958

2,840,948

BALLOON HOLDER

John C. Stickley, Atlanta, Ga.

Application December 11, 1956, Serial No. 627,681

1 Claim. (Cl. 46—32)

The present invention relates to balloon holders, and more particularly to devices for supporting and securing a balloon to a balloon stick.

The primary object of the invention is to provide a holder for supporting a balloon on the end of a balloon stick with the holder having means thereon for securing the balloon thereto.

Another object of the invention is to provide a balloon holder of the class described above with which a balloon can be supported in the air even though the gas filling the balloon is not lighter than air.

A further object of the invention is to provide a balloon holder which will support a balloon and with which the balloon can be sealed against deflation.

A still further object of the invention is to provide a balloon holder of the class described above which is inexpensive to manufacture, simple to attach, and which will be completely effective in its action.

Other objects and advantages will become apparent in the following specification when considered in the light of the attached drawings, in which.

Figure 1:
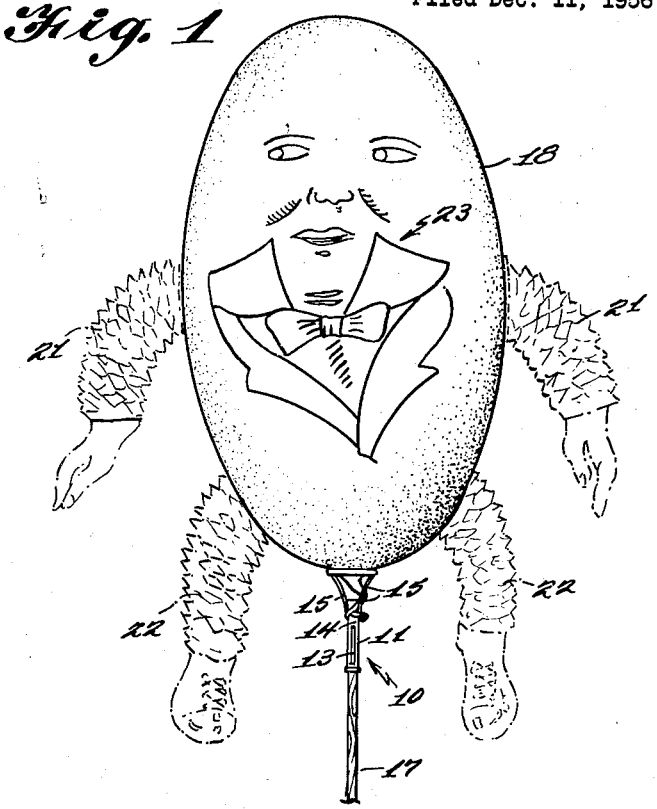
Figure 1 is a front elevation of the invention showing a balloon supported thereon.
Figure 2:
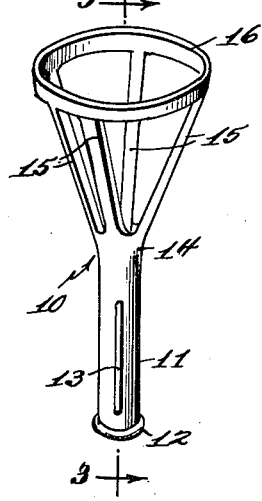
Figure 2 is a perspective view of the device.
Figure 4:
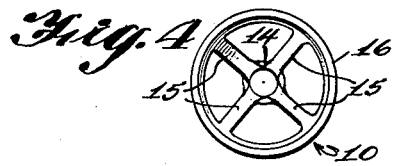
Figure 4 is a top plan view of the invention.
Figure 3:
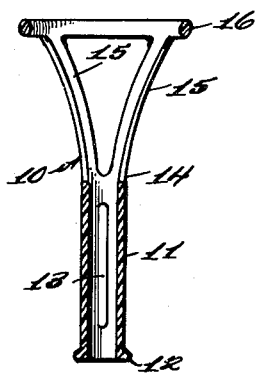
Figure 3 is a vertical cross-section taken along the line 3—3 of Figure 2, looking in the direction indicated.
Figure 5:
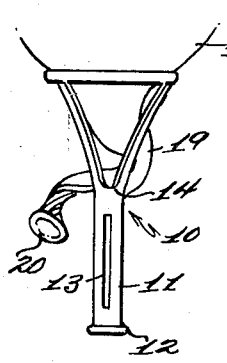
Figure 5 is a side elevation of the invention showing the balloon in the process of being attached thereto.

Referring now to the drawings in detail wherein like reference characters indicate like parts throughout the several figures, the reference numeral 10 indicates generally a balloon holder constructed in accordance with the invention.

The balloon holder 10 is formed of plastic or other suitable flexible material and is provided with a tubular shank portion 11 having a bead 12 formed on its lower outer end portion. The tubular shank 11 is provided with a plurality of longitudinally extending slots 13 so as to render the shank 11 flexible.

The tubular shank 11 terminates at its upper end in a flared neck 14 having a plurality of outwardly flaring arms 15 extending upwardly therefrom. The arms 15 diverge substantially outwardly from the neck 14 and have a ring 16 joining their upper terminal ends. The tubular shank 11, neck 14, arms 15, and ring 16 are all formed integral by any desired molding or forming process.

A balloon stick 17 extends into the tubular shank 11 and is gripped thereby due to the inherent flexibility of the shank 11 created by the slots 13.

Figure 6:
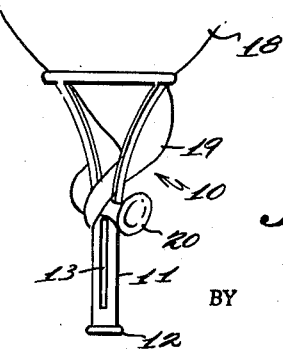
Figure 6 is a view similar to Figure 5 showing the balloon completely attached and sealed.

A balloon 18 of any desired shape is provided with a filling tube 19 terminating in a mouthpiece 20. The inflated balloon 18 is positioned with the filling tube 19 extending axially through the ring 16 and around the arms 15 and looped under itself, as shown in Figure 6, to simultaneously secure the balloon 18 to the holder 10 and seal the balloon 18 against loss of air therefrom.

With the holder 10 positioned centrally of the balloon 18, arm members 21 and leg members 22 may be secured to the balloon 18 by adhesive or any other suitable means, and by providing the balloon 18 with a printed face 23, the balloon 18 can be caused to simulate a doll or toy, thus forming an amusing device.

Having thus described the preferred embodiment of the invention, it should be understood that numerous structural modifications and adaptations may be resorted to without departing from the scope of the appended claim.

What is claimed is:

A balloon holder comprising an elongated flexible plastic tube adapted for telescopic engagement over one end of a stick, an annular plastic balloon seat ring having a diameter substantially greater than the diameter of said tube, and a plurality of flexible plastic elongated arms extending integrally from one end of said tube in outwardly diverging relation having the ends thereof opposite said tube integrally joined to said ring in circumferentially equispaced relation.

References Cited in the file of this patent

UNITED STATES PATENTS

| 662,335 | Bailey | Nov. 20, 1900 |
| 1,216,094 | Duganne | Feb. 13, 1917 |
| 1,674,814 | Anderson | June 26, 1928 |
| 2,143,691 | Goldberg et al. | Jan. 10, 1939 |
| 2,510,883 | Goldberg | June 6, 1950 |
| 2,568,389 | Elliot | Sept. 18, 1951 |
| 2,664,667 | Burroughs | Jan. 5, 1954 |